United States Patent
Seledkin et al.

(10) Patent No.: US 11,074,285 B2
(45) Date of Patent: Jul. 27, 2021

(54) RECURSIVE AGGLOMERATIVE CLUSTERING OF TIME-STRUCTURED COMMUNICATIONS

(71) Applicant: YVA.AI, INC., Menlo Park, CA (US)

(72) Inventors: Viacheslav Seledkin, Moscow (RU); David Yan, Portola Valley, CA (US); Marina Chilingaryan, Menlo Park, CA (US)

(73) Assignee: YVA.AI, INC., Menlo Park, CA (US)

( * ) Notice: Subject to any disclaimer, the term of this patent is extended or adjusted under 35 U.S.C. 154(b) by 212 days.

(21) Appl. No.: 15/972,952

(22) Filed: May 7, 2018

(65) Prior Publication Data
US 2018/0329989 A1    Nov. 15, 2018

Related U.S. Application Data

(60) Provisional application No. 62/504,390, filed on May 10, 2017.

(51) Int. Cl.
*G06F 16/35* (2019.01)
*G06F 16/93* (2019.01)
*G06F 16/33* (2019.01)

(52) U.S. Cl.
CPC ........ *G06F 16/358* (2019.01); *G06F 16/3347* (2019.01); *G06F 16/93* (2019.01)

(58) Field of Classification Search
CPC ........ G06F 17/30; G06F 16/358; G06F 16/93; G06F 16/3347
USPC ........................................................ 707/737
See application file for complete search history.

(56) References Cited

U.S. PATENT DOCUMENTS

| | | | |
|---|---|---|---|
| 10,083,176 B1* | 9/2018 | Desai | G06F 16/31 |
| 2011/0087668 A1* | 4/2011 | Thomas | G06F 16/355 |
| | | | 707/738 |
| 2011/0093464 A1* | 4/2011 | Cvet | G06F 16/355 |
| | | | 707/737 |

(Continued)

OTHER PUBLICATIONS

Salton, G., Wong, A., & Yang, C. S. (1975). A vector space model for automatic indexing. Communications of the ACM, 18(11), 613-620.

(Continued)

*Primary Examiner* — Giovanna B Colan
(74) *Attorney, Agent, or Firm* — Lowenstein Sandler LLP

(57) ABSTRACT

An example method of document clustering comprises: representing each document of a plurality of documents by a vector comprising a first plurality of real values, wherein each real value of the first plurality of real values reflects a first frequency-based metric of a term comprised by the document; partitioning the plurality of documents into a first set of document clusters based on distances between vectors representing the documents; representing each document cluster of the first set of document clusters by a vector comprising a second plurality of real values, wherein each real value of the second plurality of real values reflects a second frequency-based metric of a term comprised by the document cluster; and partitioning the first set of document clusters into a second set of document clusters based on distances between vectors representing the document clusters of the first set of document clusters.

17 Claims, 4 Drawing Sheets

(56) References Cited

U.S. PATENT DOCUMENTS

| | | | | |
|---|---|---|---|---|
| 2014/0037214 A1* | 2/2014 | Deolalikar | ............ | G06K 9/6219 |
| | | | | 382/197 |
| 2016/0012058 A1* | 1/2016 | Franceschini | ......... | G06F 16/951 |
| | | | | 707/728 |
| 2018/0024968 A1* | 1/2018 | Clinchant | ............ | G06N 3/0454 |
| | | | | 706/12 |
| 2018/0276294 A1* | 9/2018 | Takemoto | ............ | G06F 16/3331 |

OTHER PUBLICATIONS

Ester, M., Kriegel, H. P., Sander, J., & Xu, X. (Aug. 1996,). A density-based algorithm for discovering clusters in large spatial databases with noise. In Kdd (vol. 96, No. 34, pp. 226-231).

Ankerst, M., Breunig, M. M., Kriegel, H. P., & Sander, J. (Jun. 1999,). OPTICS: ordering points to identify the clustering structure. In ACM Sigmod record (vol. 28, No. 2, pp. 49-60). ACM.

Yianilos, P. N. (Jan. 1993,). Data structures and algorithms for nearest neighbor search in general metric spaces. In SODA (vol. 93, No. 194, pp. 311-321).

Smiti, Abir and Elouedi, Zied, Cinti 2015, 16th IEEE International Symnposium on Computational Intelligence and INformatics, "Dynamic DBSCAN-GM Clustering Algorithm", Nov. 19-21, 2015, 6 pages.

* cited by examiner

RECURSIVE AGGLOMERATIVE CLUSTERING OF TIME-STRUCTURED COMMUNICATIONS

REFERENCE TO RELATED APPLICATIONS

This application is related to and claims the benefit of U.S. Patent Application No. 62/504,390, filed May 10, 2017, which is incorporated by reference herein in its entirety.

TECHNICAL FIELD

The present disclosure is generally related to computer systems, and is more specifically related to systems and methods of processing structured communications.

BACKGROUND

In the digital age, users of electronic communication systems, such as electronic mail and other messaging systems, are forced to deal with unprecedentedly large volumes of information; this volume of information grows exponentially through the increasing number of files, contacts, documents, and other types of data communicated between the users on a daily basis. This dramatic increase can be explained by a number of reasons. The number of various activities and projects that the users are involved in keeps growing; on the other hand, electronic communication solutions at the users' disposition have expanded, ranging from electronic mail and messengers to integrated business communication platforms, while the amount of data sources grows in proportion with the number of the technological and software advancements.

SUMMARY

An example method of document clustering may comprise: representing each document of a plurality of documents by a vector comprising a first plurality of real values, wherein each real value of the first plurality of real values reflects a first frequency-based metric of a term comprised by the document; partitioning the plurality of documents into a first set of document clusters based on distances between vectors representing the documents; representing each document cluster of the first set of document clusters by a vector comprising a second plurality of real values, wherein each real value of the second plurality of real values reflects a second frequency-based metric of a term comprised by the document cluster; and partitioning the first set of document clusters into a second set of document clusters based on distances between vectors representing the document clusters of the first set of document clusters.

Another example method of document clustering may comprise: representing each document cluster of a first set of document clusters by a vector comprising a plurality of real values, wherein each real value reflects a frequency-based metric of a term comprised by the document cluster, wherein the frequency-based metric if provided by a function of a ratio of a number of largest document clusters in the set of document clusters and a number of the largest clusters which include the term; and partitioning the first set of document clusters into a second set of document clusters based on distances between vectors representing document clusters of the set of document clusters.

Another example method of document clustering may comprise: representing each document of a plurality of documents by a vector comprising a plurality of real values, wherein each real value reflects a frequency-based metric of a term comprised by the document; and partitioning the plurality of documents into a set of document clusters based on distances between vectors representing the documents, wherein a distance between a first vector representing a first document of the plurality of documents and a second vector representing a second document of the plurality of documents is provided by a function of a time-sensitive factor and a content-sensitive factor, wherein the time-sensitive factor is determined based on at least one of: a first time identifier associated with the first document and a second time identifier associated with the second document.

An example method of document cluster labeling may comprise: selecting a current document cluster of a plurality of document clusters; initializing a label associated with the current document cluster; selecting a term from a list of terms comprised by the document cluster; appending the term to the label associated with the current document cluster; responsive to determining that the label is found in a label dictionary, iteratively selecting a next term from the list of terms comprised by the document cluster and appending the next term to the label associated with the current document cluster; and responsive to failing to locate the label in the label dictionary, inserting the label into the label dictionary; and associating the label with the current document cluster.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
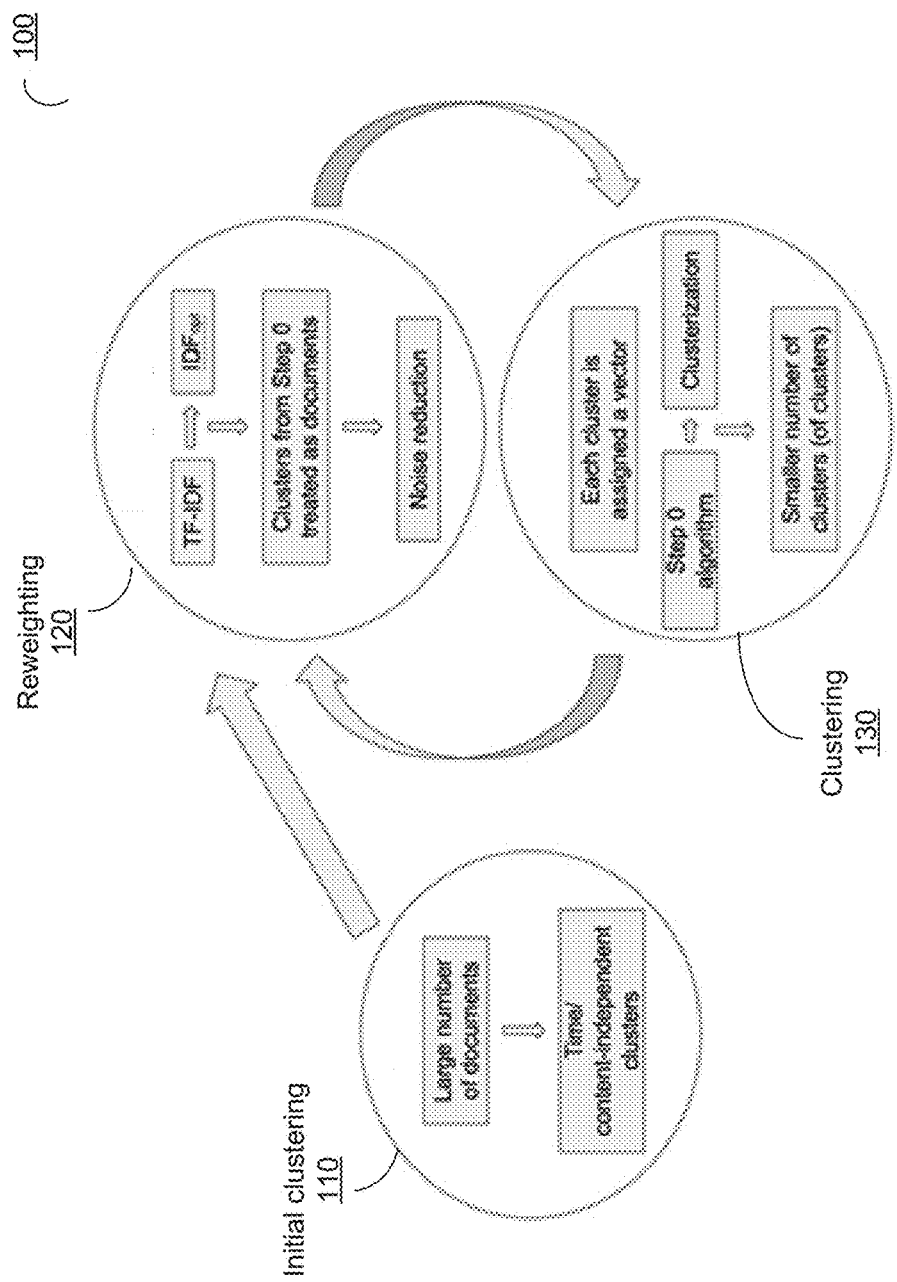
FIG. 1 schematically illustrates an example recursive agglomerative clustering procedure implemented in accordance with one or more aspects of the present disclosure.

Described herein are systems and methods for recursive agglomerative clustering of time-structured communications.

The efficiency of handling large volumes of information conveyed by multiple documents may be improved by performing document classification, i.e., associating each textual document with a category of documents. Document clustering is a classification methodology which involves grouping a set of documents into a plurality of clusters, such that the number of clusters and/or distinguishing characteristics of each clusters may not a priori be known.

Results of document clustering may be visualized by representing each document by a vector (or a point) in the hyperspace of document features. Various document clustering methodologies are based on the notion of the local density in the vicinity of the point representing a document, where the density is measured by the number of neighboring points found within the vicinity of a given point. Thus, a cluster may be represented by a group of points that has a relatively higher density than its surrounding areas. The documents that are not assigned to any clusters may be considered as outliers conveying the informational noise.

In an illustrative example, according to DBSCAN algorithm, documents may be assigned to clusters by a procedure that groups together the points that have a relatively high number of nearby neighbors (e.g., the number of neighbors exceeding a threshold value), marking as outliers the points that lie in low-density regions. The algorithm preserves mutual reachability of documents within a single cluster— that is, for any pair of documents from a certain cluster, there should be a path which is completely contained within the cluster and that passes through the core of the cluster. In another illustrative example, according to OPTICS algorithm, the problem of detecting meaningful clusters in a data set of varying density is addressed by linearly ordering the points such that the points which are spatially closest become neighbors in the ordering. Additionally, a special value is stored for each point that represents the density which needs to be accepted for a cluster in order to have both points belong to the same cluster.

However, the inventors noted that applying various local density-based clustering methods to electronic mail messages does not always produce satisfactory results. Electronic mail messages represent a special type of textual documents, in that they follow a certain structure, which specifies certain mandatory fields (such as sender, receiver, one or more timestamps, etc.) and optional fields which may be left blank (such as the subject of the message, the body of the message, reference to related messages, etc.). Bodies of electronic mail messages are usually relatively shorter than those of other document types, which may impair the ability of common document classification methods to produce useful results when applied to electronic mail messages, since common classification methods usually operate on document features that are extracted from document bodies. Furthermore, being unaware of the electronic mail message structure that describes various metadata fields, common classification methods may fail to extract and utilize some useful information that may be conveyed by various metadata fields of electronic mail messages.

The present disclosure addresses the above-noted and other deficiencies of common document classification methods, by providing methods of recursive agglomerative clustering which take into account document metadata, such as timestamps, message subjects, and sending/receiving party identifiers, as described in more detail herein below. Thus, implementations of the present disclosure represent improvements to the functionality of general purpose and/or specialized computer systems.

The systems and methods described herein facilitate efficient navigation through large collections of documents, by classifying the documents and visually representing the classification results. In certain implementations, a clustering procedure may operate on the document features that are extracted from the sender and recipient identifiers specified by each message, such as the sender address (specified by From: field of the electronic mail message header) and one or more recipient addresses (specified by To: and Cc: fields of the electronic mail message header). In order to further improve the clustering quality, the clustering procedure may include several consecutive stages, such that each stage employs a special technique of re-weighting the components of the document feature vector. Clustering methods of the present disclosure do not require any supervised learning, thus efficiently implementing the data-driven approach to data classification.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation. In particular, certain specific examples are referenced and described herein for illustrative purposes only and do not limit the scope of the present disclosure to any particular bus width values.

As noted herein above, a document (e.g., an electronic mail message) may be represented by a vector of features, which are derived from the terms extracted from the document body and/or document metadata. Accordingly, a named entity extraction pipeline may be employed to extract the named entities from To:, Cc:, and/or From: fields of a corpus of electronic mail messages (e.g., a user's electronic mailbox). In certain implementations, another named entity extraction pipeline may be employed to extract the named entities from the body and/or subject line of the electronic mail messages. In certain implementations, yet another extraction pipeline may be employed for extracting document timestamps.

Each extracted entity name may be case-normalized and transformed into one or more terms, such that each term would comprise one or more tokens (words) of the entity name. In an illustrative example, the entity name "John Smith" would produce the following terms: "John," "Smith," and "John Smith."

Electronic mail addresses may be tokenized into the name part and domain part. In an illustrative example, the electronic mail address JohnSmith@data.services.com would produce the following name terms: "John," "Smith," and "John Smith" and the following domain terms: "Data," "Services," "Data Services." The top-most domain (e.g., .com, .org, etc.) may be discarded as it usually does not convey any useful information.

Every document may then be mapped to a multi-dimensional sparse vector in the hyperspace of the document features, e.g., using the Term Frequency-Inverse Document Frequency (TF-IDF) weighting scheme, according to which each document is represented by a vector of term frequency-inverse document frequency (TF-IDF) values.

Term frequency (TF) represents the frequency of occurrence of a given word in the document:

$$tf(t,d) = n_t / \Sigma n_k$$

where t is the word identifier, d is the document identifier, $n_t$ is the number of occurrences of the word t within document d, and $\Sigma n_k$ is the total number of words within document d.

Inverse document frequency (IDF) is the logarithmic ratio of the number of documents in the analyzed corpus to the number of documents containing the given word:

$$idf(t,d) = \log (N_d / df_t)$$

where $N_d$ is the number of documents in the corpus being analyzed, and $df_t$ is the number of documents which contain the word t Thus, each document may be represented by a vector of TF-IDF values corresponding to the words comprised by the document:

$$V_d = [w_1, w_2, \ldots, w_n]$$

where $$w_t = tf_t \cdot \log\frac{N_d}{df_t}$$

$tf_t$ is the term frequency of term t in document d,
$N_d$ is the number of documents, and
$df_t$ is the number of documents containing term t.

Communication between people may be viewed as a time structured process, hence, in certain implementations, the clustering procedure may further take into account the timestamps of the documents. Accordingly, the distance between two documents in the hyperspace of the document features may be represented by a product of the time-sensitive factor and the content-sensitive factor as follows:

$$S(\underline{V}_{d1}, \underline{V}_{d2}) = S_{time} * S_{con}$$

$$S_{time} = 1 + \frac{|t_{d1} - t_{d2}|}{T}$$

$$S_{con} = \frac{2}{\pi} * \arccos\left(\frac{\underline{V}_{d1} * \underline{V}_{d2}}{\|\underline{V}_{d1}\| * \|\underline{V}_{d2}\|}\right)$$

Where T is the time sensitivity parameter, and
$t_{d1}, t_{d2}$—document timestamps, $\underline{V}_{d1}, \underline{V}_{d2}$—document vectors.

The normalized angular form of $S_{con}$ instead of the cosine similarity is chosen in order to produce a normalized distance metric whose values would range from 0 to 1.

While various implementations of clustering procedures may suffer from very high computational complexity due to the need of computing distance metric values for a large number for document pairs, the methods and systems of the present disclosure alleviate this issue by avoiding to compute the computationally expensive $S_{com}$ component if the computationally cheap $S_{time}$ component exceeds a certain threshold.

In order to further improve the clustering quality, the clustering procedure may include several consecutive stages, such that each stage employs a special technique of re-weighting the components of the document feature vector. FIG. 1 schematically illustrates an example recursive agglomerative clustering procedure implemented in accordance with one or more aspects of the present disclosure. The clustering procedure may start by utilizing the above-described or a similar distance metric to perform the initial clustering operation 110 for partitioning a large number of input documents into a relatively large number of clusters.

The inventors noted that terms which are shared by large amount of clusters are noisy, and reducing their weight may be beneficial for increasing the clustering quality. The inventors further noted that the majority of such noisy terms are within a small amount of large clusters formed by the initial clustering operation. Based on these observations, reweighting operation 120 of FIG. 1 may re-calculate the TF-IDF metrics as described in more detail herein below.

Treating every cluster as a document, the IDF component of the term weight may be defined as follows:

$$IDF_t = \log\frac{NC_0}{cf_{t,0}}$$

where $NC_0$ is the number of clusters produced by the initial clustering operation, and
$cf_t$ is the number of clusters containing term t.
Furthermore, taking only $NC_{top}$ clusters into account:

$$IDF_{top,t} = \log\frac{NC_{top,0}}{cf_{top,t,0}}$$

where $cf_{top,t,0}$ is the number of top clusters containing term t. $IDF_{opt}$ by design has small value for terms shared by large number of top clusters.

In order to alleviate the negative effect of noisy terms, the IDF metric may be modified as follows:

$$IDF_{opt,t} = IDF_{top,t}, \text{ if } IDF_{top,t} < LC$$

and $IDF_{opt,t} = IDF_t$ otherwise where LC is a global clustering parameter which balances the choice between noisy and information-bearing terms.

Clustering operation 130 of FIG. 1 treats every initial cluster as a document and associates the following vector with every cluster:

$$V_{c,0} = [w_{1,0}, w_{2,0}, \ldots, w_{n,0}]$$

where $W_{t,0} = tf_{t,0} \cdot IDF_{opt,t}$
$tf_{t,0}$ is term frequency of term t in cluster c.

The resulting vectors are then clusterized by a density-based clustering procedure. In an illustrative example, documents may be assigned to clusters by a procedure that groups together the points that have a relatively high number of nearby neighbors (e.g., the number of neighbors found within a specified vicinity of a given point should exceed a threshold value), marking as outliers the points that lie in the remaining low-density regions. Thus, clustering operation 130 of FIG. 1 produces a significantly lower number of clusters as compared to the initial number of clusters: while some of the clusters produced by initial clustering operation 110 may survive the subsequent clustering operation 130, at least some of the initial clusters would be merged by the subsequent clustering operation 130.

In certain implementations the reweighting and clustering operations 120-130 may be iteratively repeated until the number of clusters has stabilized (i.e., is not significantly changed by performing the last reweighting/clustering operation). Iteratively applying clustering and reweighting steps gradually improves the clustering quality through aggregation of small clusters produced by the previous iteration, followed by discrimination of noisy features. Thus, the clustering procedure produces a relatively small number of large clusters reflecting the user activity structured by communication and temporal aspects.

Figure 2:
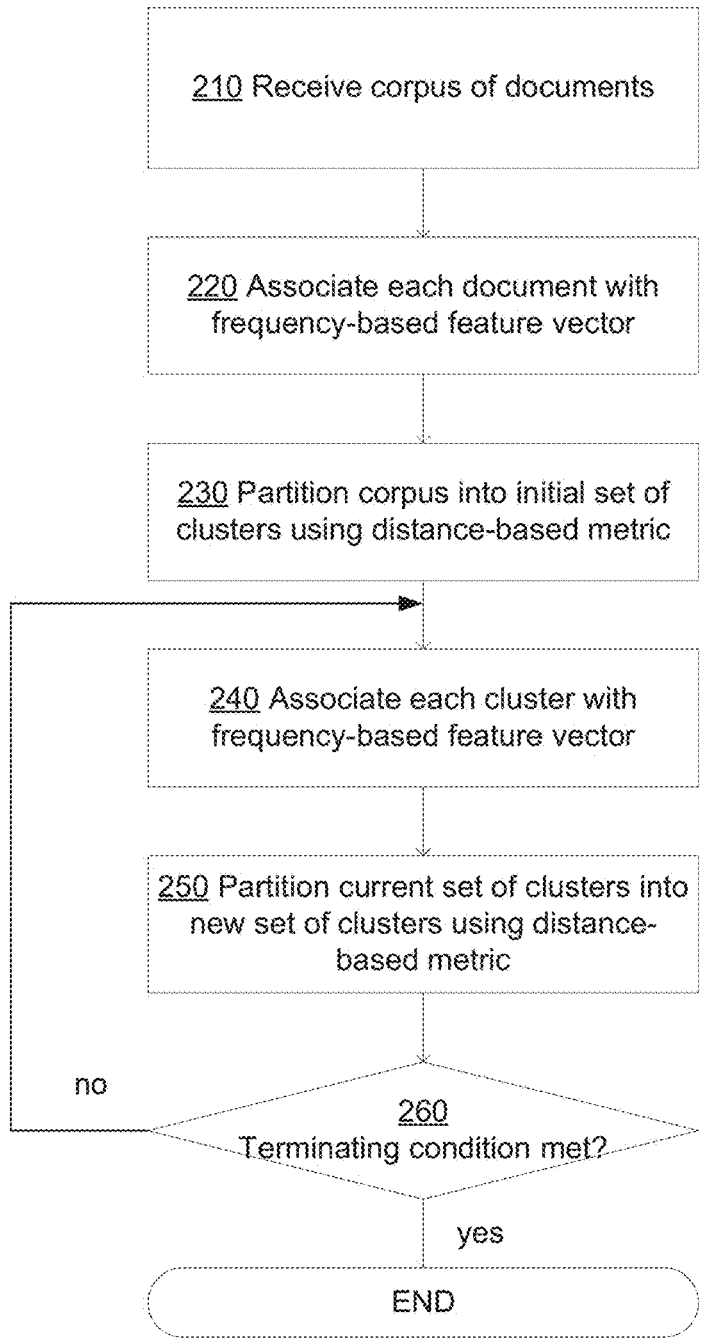
FIG. 2 depicts a flow diagram of an example method of recursive clustering, in accordance with one or more aspects of the present disclosure.

FIG. 2 depicts a flow diagram of an example method 200 of recursive clustering, in accordance with one or more aspects of the present disclosure. Method 200 produces the initial sets of document clusters and then iteratively treats the clusters produced by the previous iteration as documents which are further clusterized, as described in more detail herein above with reference to FIG. 1. Method 200 and/or each of its individual functions, routines, subroutines, or operations may be performed by one or more processors of the computer system (e.g., the computer system 1000 of FIG. 4) implementing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, the computer system implementing the method may receive a document corpus comprising a plurality of documents. In an illustrative example, the document corpus may be provided by an electronic mailbox comprising a plurality of electronic mail messages.

At block 220, the computer system may associate each document of the document corpus with a vector of real values, such that each real value reflects a frequency-based metric of a term comprised by the document. In various illustrative examples, the term may be provided by an identifier of a named entity comprised by the document or a time identifier (such as a timestamp) associated with the document. The frequency-based metric may be provided by a TF-IDF metric, as described in more detail herein above.

At block 230, the computer system may partition the corpus of documents into an initial set of document clusters by a density-based clustering procedure which utilizes distance-based metric reflecting distances between the vectors representing the documents. In an illustrative example, the distance between two vectors representing two documents may be reflected by a function of a time-sensitive factor and a content-sensitive factor. The time-sensitive factor may take into account the difference between the timestamps of the documents The content-sensitive factor may be computed based on the TF-IDF metric values of the terms comprised by the documents. Thus, the distance metric may be expressed by the following equations:

$$S(\underline{V}_{d1}, \underline{V}_{d2}) = S_{time} * S_{con}$$

$$S_{time} = 1 + \frac{|t_{d1} - t_{d2}|}{T}$$

$$S_{con} = \frac{2}{\pi} * \arccos\left(\frac{\underline{V}_{d1} * \underline{V}_{d2}}{\|\underline{V}_{d1}\| * \|\underline{V}_{d2}\|}\right),$$

as described in more detail herein above.

At block 240, the computer system may represent by a vector of real values each document cluster of the set of document clusters produced by the previous iteration, such that each real value reflects a frequency-based metric of a term comprised by the document cluster. In an illustrative example, the frequency-based metric may be provided by a function which reflects the ratio of the number of largest document clusters in the set of document clusters and the number of the largest clusters which include the term, which may be expressed by the following equations $$IDF_{opt,t} = IDF_{top,t}, \text{ if } IDF_{top,t} < LC$$

and $IDF_{opt,t} = IDF_t$ otherwise, as described in more detail herein above.

At block 250, the computer system may partition the set of document clusters produced by the previous iteration into a new set of document clusters by a density-based clustering procedure which utilizes a distance-based metric reflecting distances between the vectors representing the document clusters of the initial set of document clusters. In an illustrative example, each cluster may be represented by the following vector:

$$V_{c,0} = [w_{1,0}, w_{2,0}, \ldots, w_{n,0}]$$

where $w_{t,0} = tf_{t,0} \cdot IDF_{opt,t}$ $tf_{t,0}$ is term frequency of term t in cluster c.

The same distance metric as described herein above with reference to block 230 may be utilized for performing operations of block 250.

Responsive to determining, at block 260, that a terminating condition has been met, the method may terminate; otherwise, the method may loop back to block 240. In an illustrative example, evaluating the terminating condition may involve ascertaining that the number of clusters has stabilized (i.e., has not significantly changed by performing the last reweighting/clustering operation), as described in more detail herein above.

As noted herein above, the classification results may be visually represented via a graphical user interface. Visually representing the clusters may involve assigning a human-readable label to every cluster. Such a label should be short, it should reflect the cluster content, and should be distinctive from other cluster labels.

The cluster labeling method operating in accordance with one or more aspects of the present disclosure may start by sorting the clusters by the respective numbers of documents comprised by each cluster. For each cluster starting from the topmost one, a sorted list of terms may be built according to the term weights. All partial features introduced by the above-described tokenization procedure, such as parts of entity names, may be discarded when producing the sorted lists of terms.

The labeling method may initialize and maintain a dictionary of labels that have already been used as cluster labels. For each cluster starting from the topmost one, the first label from its sorted list of terms may be designated as the label for the cluster. If the cluster label is not found in the label dictionary, the label may be appended to the label dictionary, and the method may loop back to processing the next cluster on the list. Otherwise, if the cluster label has already been found in the label dictionary, the next term from the sorted list of terms may be appended to the cluster label, which may be repeated iteratively until the modified label is not found in the label dictionary, as described in more detail herein below with reference to FIG. 3.

Figure 3:
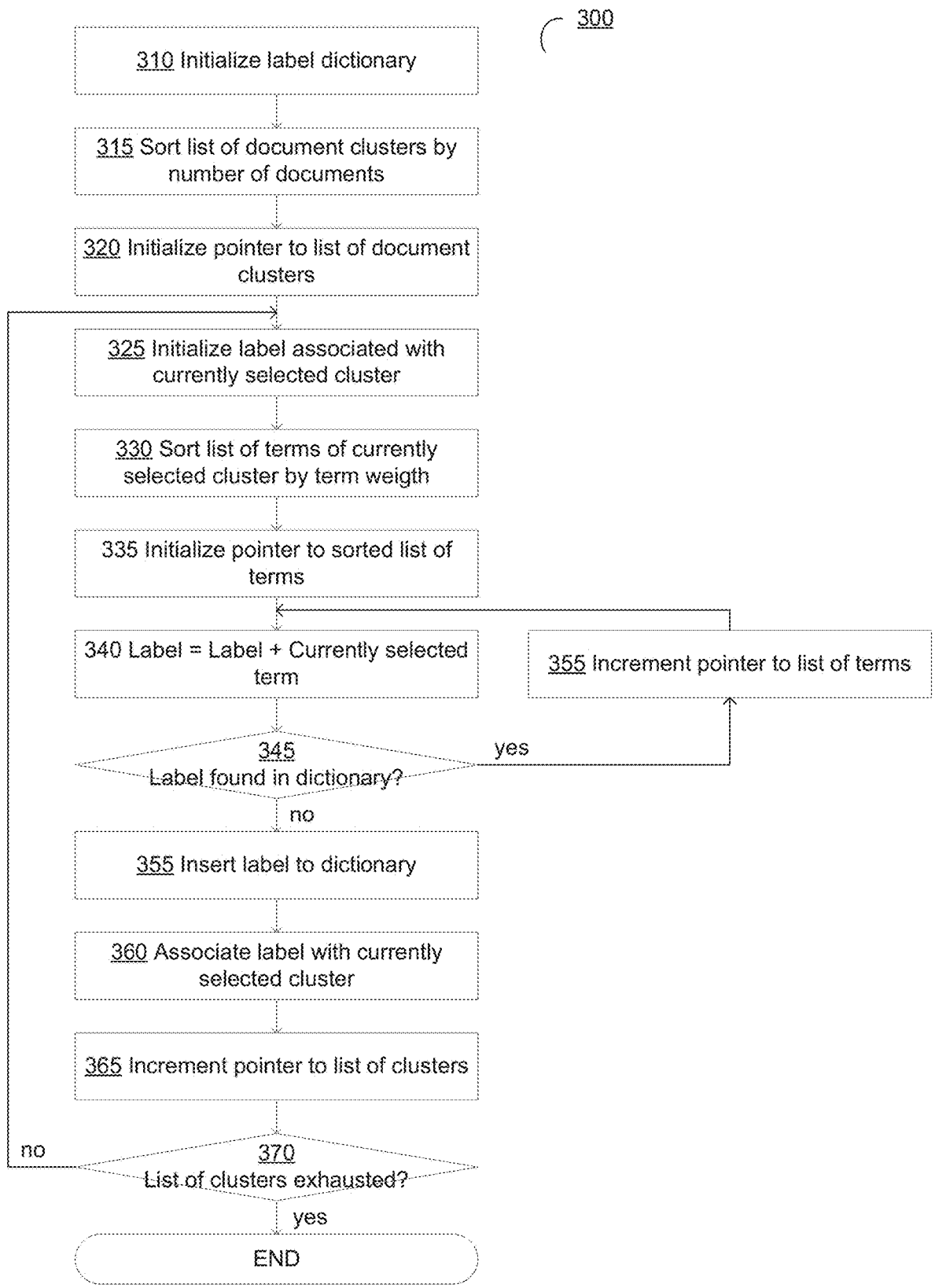
FIG. 3 depicts a flow diagram of an example method of document cluster labeling, in accordance with one or more aspects of the present disclosure.

FIG. 3 depicts a flow diagram of an example method 300 of document cluster labeling, in accordance with one or more aspects of the present disclosure. Method 300 produces the initial sets of document clusters and then iteratively treats the clusters produced by the previous iteration as documents which are further clusterized, as described in more detail herein above. Method 300 and/or each of its individual functions, routines, subroutines, or operations may be performed by one or more processors of the computer system (e.g., the computer system 1000 of FIG. 4) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the computer system implementing the method may initialize, with an empty list, a label dictionary associated with a plurality of document clusters.

At block 315, the computer system may sort, in the descending order, the plurality of document clusters by the respective number of documents comprised by each cluster.

At block 320, the computer system may initialize the pointer to the sorted list of clusters to select the first cluster from the sorted list of clusters.

At block 325, the computer system may initialize, with an empty value, a label associated with the currently selected cluster.

At block 330, the computer system may sort by the term weight, in the descending order, the list of terms of the currently selected cluster. All partial features introduced by the above-described tokenization procedure, such as parts of entity names, may be discarded when producing the sorted lists of terms.

At block 335, the computer system may initialize the pointer to the sorted list of terms to select the first term from the sorted list of terms of the currently selected cluster.

At block 340, the computer system may append the currently selected term to the label associated with the currently selected cluster.

Responsive to determining, at block 345, that the label is found in the label dictionary, the computer system may, at block 350, increment the pointer to the list of terms, and the method may loop back to block 340. Otherwise, responsive to determining, at block 345, that the label is not found in the label dictionary, the computer system may, at block 355, insert the label into the label dictionary.

At block 360, the computer system may associate the label with the currently selected cluster.

At block 365, the computer system may increment the pointer to the sorted list of clusters. Responsive to determining, at block 370, that the list of cluster has not yet been exhausted, the method may loop back to block 325; otherwise, the method may terminate.

Figure 4:
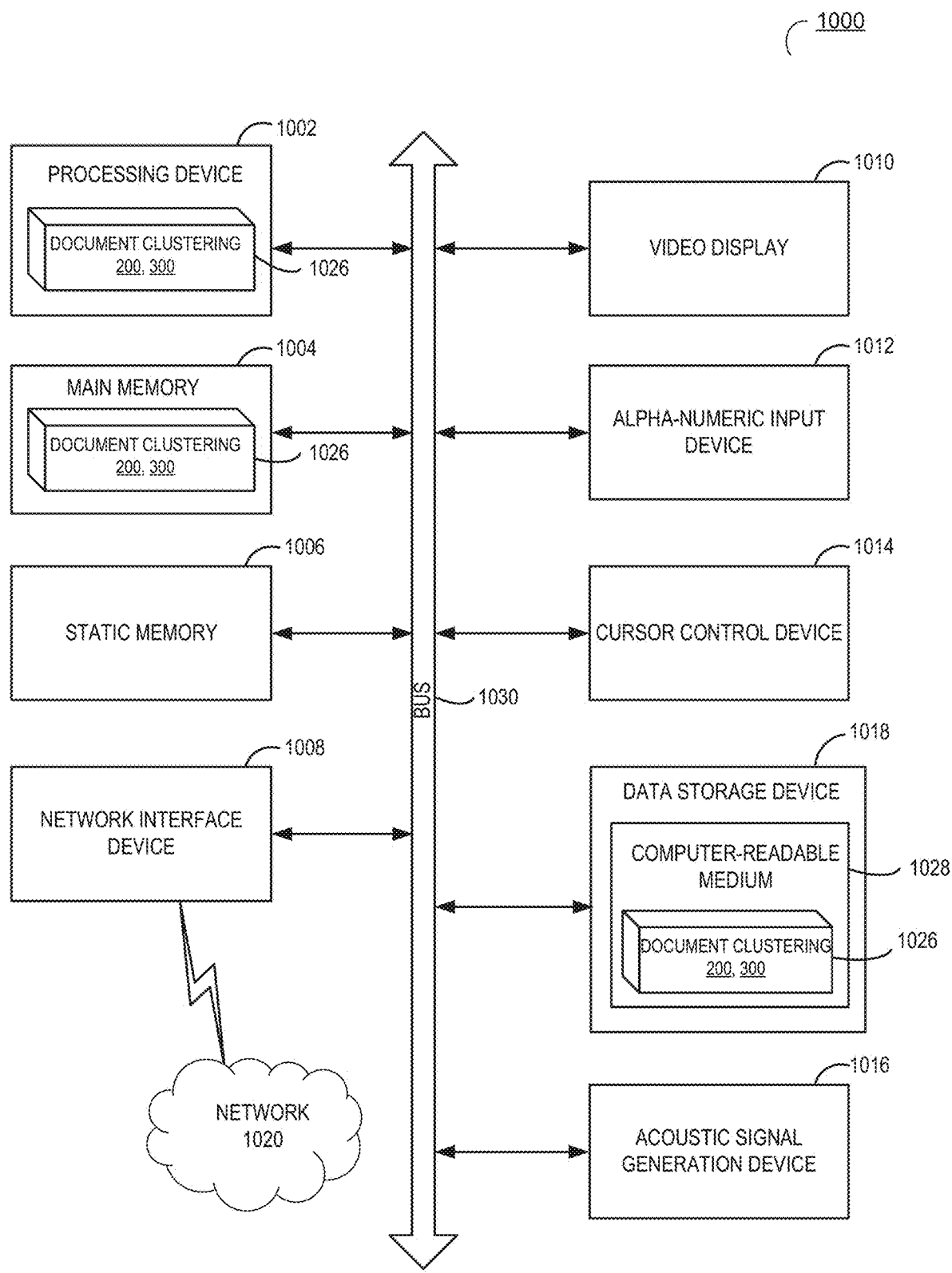
FIG. 4 schematically illustrates a component diagram of an example computer system which may perform the methods described herein.

FIG. 4 schematically illustrates a component diagram of an example computer system 1000 which may perform the methods described herein. Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 200 of recursive clustering and/or method 300 of document cluster labeling, in accordance with one or more aspects of the present disclosure.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 200 of recursive clustering and/or method 300 of document cluster labeling, in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method of document clustering by a computer system, the method comprising:
   representing each document of a plurality of documents by a vector comprising a first plurality of real values, wherein each real value of the first plurality of real values reflects a first frequency-based metric of a first term comprised by the document;
   partitioning the plurality of documents into a first set of document clusters based on distances between vectors representing the documents, wherein a distance between a first vector representing a first document of the plurality of documents and a second vector representing a second document of the plurality of documents is provided by a function of a time-sensitive factor and a content-sensitive factor, wherein the time-sensitive factor is determined based on at least one of: a first time identifier associated with the first document and a second time identifier associated with the second document;
   representing each document cluster of the first set of document clusters by a vector comprising a second plurality of real values, wherein each real value of the second plurality of real values reflects a second frequency-based metric of a second term comprised by the document cluster; and
   partitioning the first set of document clusters into a second set of document clusters based on distances between vectors representing the document clusters of the first set of document clusters.

2. The method of claim 1, wherein the first term is provided by at least one of: an identifier of a named entity comprised by the document or a time identifier associated with the document.

3. The method of claim 1, wherein the plurality of documents is provided by an electronic mailbox comprising a plurality of electronic mail messages.

4. The method of claim 1, wherein the first frequency-based metric is provided by a term frequency—inverse document frequency (TF-IDF) metric.

5. The method of claim 1, wherein the second frequency-based metric is provided by a function of a ratio of a number of largest document clusters in the first set of document clusters and a number of the largest clusters which include the second term.

6. The method of claim 1, further comprising:
   representing each document cluster of the second set of document clusters by a vector comprising a third plurality of real values, wherein each real value of the third plurality of real values reflects the second frequency-based metric of a third term comprised by the document cluster; and
   partitioning the second set of document clusters into a third set of document clusters based on distances between vectors representing the document clusters of the second set of document clusters.

7. The method of claim 1, further comprising:
   associating each cluster of the second set of document clusters with a textual label.

8. The method of claim 1, further comprising:
   visually representing one or more clusters of the second set of document clusters via a graphical user interface.

9. A non-transitory computer-readable storage medium comprising executable instructions that, when executed by a computer system, cause the computer system to:
   represent each document of a plurality of documents by a vector comprising a first plurality of real values, wherein each real value of the first plurality of real values reflects a first frequency-based metric of a first term comprised by the document;
   partition the plurality of documents into a first set of document clusters based on distances between vectors representing the documents;
   represent each document cluster of the first set of document clusters by a vector comprising a second plurality of real values, wherein each real value of the second plurality of real values reflects a second frequency-based metric of a second term comprised by the document cluster, wherein the second frequency-based metric is provided by a function of a ratio of a number of largest document clusters in the first set of document clusters and a number of the largest clusters which include the second term; and partition the first set of document clusters into a second set of document clusters based on distances between vectors representing the document clusters of the first set of document clusters.

10. The non-transitory computer-readable storage medium of claim 9, wherein the first term is provided by at least one of: an identifier of a named entity comprised by the document or a time identifier associated with the document.

11. The non-transitory computer-readable storage medium of claim 9, wherein the plurality of documents is provided by an electronic mailbox comprising a plurality of electronic mail messages.

12. The non-transitory computer-readable storage medium of claim 9, wherein the first frequency-based metric is provided by a term frequency—inverse document frequency (TF-IDF) metric.

13. The non-transitory computer-readable storage medium of claim 9, wherein a distance between a first vector representing a first document of the plurality of documents and a second vector representing a second document of the plurality of documents is provided by a function of a time-sensitive factor and a content-sensitive factor, wherein the time-sensitive factor is determined based on at least one of: a first time identifier associated with the first document and a second time identifier associated with the second document.

14. The non-transitory computer-readable storage medium of claim 9, further comprising executable instructions causing the computer system to:

represent each document cluster of the second set of document clusters by a vector comprising a third plurality of real values, wherein each real value of the third plurality of real values reflects the second frequency-based metric of a third term comprised by the document cluster; and partition the second set of document clusters into a third set of document clusters based on distances between vectors representing the document clusters of the second set of document clusters.

15. A system, comprising:

a memory; and a processor coupled to the memory, wherein the processor is configured to:

represent each document of a plurality of documents by a vector comprising a first plurality of real values, wherein each real value of the first plurality of real values reflects a first frequency-based metric of a first term comprised by the document;

partition the plurality of documents into a first set of document clusters based on distances between vectors representing the documents, wherein a distance between a first vector representing a first document of the plurality of documents and a second vector representing a second document of the plurality of documents is provided by a function of a time-sensitive factor and a content-sensitive factor, wherein the time-sensitive factor is determined based on at least one of: a first time identifier associated with the first document and a second time identifier associated with the second document;

represent each document cluster of the first set of document clusters by a vector comprising a second plurality of real values, wherein each real value of the second plurality of real values reflects a second frequency-based metric of a second term comprised by the document cluster; and partition the first set of document clusters into a second set of document clusters based on distances between vectors representing the document clusters of the first set of document clusters.

16. The system of claim 15, wherein the first term is provided by at least one of: an identifier of a named entity comprised by the document or a time identifier associated with the document.

17. The system of claim 15, wherein the second frequency-based metric is provided by a function of a ratio of a number of largest document clusters in the first set of document clusters and a number of the largest clusters which include the second term.

* * * * *